United States Patent
Fukumura et al.

(10) Patent No.: US 7,481,711 B2
(45) Date of Patent: Jan. 27, 2009

(54) STRUCTURE FOR PREVENTING SHAFT OF CONSTANT VELOCITY JOINT FROM COMING OFF

(75) Inventors: Yoshikazu Fukumura, Iwata (JP); Tsuyoshi Ueno, Iwata (JP); Chikaya Shinba, Iwata (JP); Takaaki Shibata, Iwata (JP)

(73) Assignee: NTN Corporation, Osaka-Fu (JP)

( * ) Notice: Subject to any disclaimer, the term of this patent is extended or adjusted under 35 U.S.C. 154(b) by 241 days.

(21) Appl. No.: 11/377,424

(22) Filed: Mar. 17, 2006

(65) Prior Publication Data

US 2006/0211505 A1    Sep. 21, 2006

(30) Foreign Application Priority Data

Mar. 18, 2005    (JP)    ............... 2005-079764

(51) Int. Cl.
  *F16D 1/116*    (2006.01)
(52) U.S. Cl. .................. 464/182; 464/906; 403/359.5; 403/DIG. 7
(58) Field of Classification Search .............. 464/182, 464/904–906; 403/359.5, DIG. 7
See application file for complete search history.

(56) References Cited

U.S. PATENT DOCUMENTS

| | | | | |
|---|---|---|---|---|
| 3,750,489 A | * | 8/1973 | Caldwell | ............... 403/DIG. 7 |
| 4,261,668 A | * | 4/1981 | Rigal | .................. 403/359.5 X |
| 5,499,884 A | * | 3/1996 | Kuhnhold et al. | ......... 403/359.5 |
| 5,667,332 A | * | 9/1997 | Lindholm | ................ 403/359.5 |
| 6,390,925 B1 | * | 5/2002 | Perrow | ....................... 464/905 |
| 6,749,517 B2 | * | 6/2004 | Ouchi | ......................... 464/906 |
| 6,913,540 B2 | * | 7/2005 | Iihara et al. | ................. 464/906 |

FOREIGN PATENT DOCUMENTS

| JP | 64-5124 | 1/1989 |
|---|---|---|
| JP | 08-68426 | 3/1996 |

* cited by examiner

*Primary Examiner*—Greg Binda
(74) *Attorney, Agent, or Firm*—Wenderoth, Lind & Ponack L.L.P.

(57) ABSTRACT

A constant velocity joint structure including an inner joint member, a retaining ring, and a shaft which are configured to prevent the shaft from being withdrawn from the inner joint member when a pulling force is applied to one side of the shaft is disclosed. A retaining ring groove is disposed at an opposite side of the shaft. In a preferred embodiment, the retaining groove has at least two points which contact an inner surface of the retaining ring when the pulling force is applied to prevent the retaining ring from contracting in a radial direction, thereby preventing the shaft from being withdrawn from the inner joint member.

10 Claims, 4 Drawing Sheets

STRUCTURE FOR PREVENTING SHAFT OF CONSTANT VELOCITY JOINT FROM COMING OFF

BACKGROUND OF THE INVENTION

1. Field of the Invention

The present invention relates to a spline engagement structure for coupling an inner joint member with a shaft of constant velocity joints used in automobiles and various industrial equipment.

2. Description of the Related Art

In conventional constant velocity joints for a driving system or the like of automobiles, an inner joint member and a shaft are engaged detachably, and a structure for preventing the shaft from coming off is employed for reduction of the maintenance man-hours for replacement of boots or the like. In this structure, a groove is formed at an end face of the shaft, a retaining ring is provided in this groove, and the shaft is engaged with a contacting face being formed on the inner joint member by means of elastic expansion of the retaining ring. A corner is provided on the contacting face to interfere with the retaining ring when the shaft is pulled out, and disengagement is performed by radially contracting the retaining ring by a component force of the interference force with the retaining ring (see Japanese Unexamined Patent Publication No. 08-68426, Japanese Utility Model Publication No. 64-5124).

There is a demand for a structure for connecting a shaft and an inner joint member so that they cannot be disassembled once built.

A structure according to Japanese Unexamined Patent Publication No. 08-68426 is such that a retaining ring is provided at a non-end face side of a shaft and a groove for inserting a tool for contracting a retaining ring is provided at an end face of an inner joint member, thereby allowing assembly and disassembly. However, this mechanism requires much time and forming the tool engagement groove on the inner joint member is expensive.

Further, Japanese Utility Model Publication No. 64-5124 discloses a structure for contracting a retaining ring thereby allowing a shaft to be pulled out. The publication, however, does not show how to manage an angle of a groove in a sidewall for effecting two types of configurations where one allows a shaft to be pulled out and the other does not.

SUMMARY OF THE INVENTION

Considering the aforementioned problems, the present invention provides a structure adapted to bring about two functions without increasing the number of inside joint members, one of which prevents a shaft from coming off once the joint is assembled, and the other allows a shaft to be pulled out. The present invention provides a structure for preventing a shaft of constant velocity joint from coming off. The structure comprises an inner joint member having an insertion hole to be engaged with a shaft, a shaft having a ring-shaped retaining ring groove, and a retaining ring located within the retaining ring groove that can be elastically expanded and contracted. In the invention, since the retaining ring is disposed between a slope part formed in an insertion hole of the inner joint member and the retaining groove, the shaft cannot usually be pulled out when a pulling force is applied to the shaft. The structure of the invention comprises at least two contacting points in a sidewall of the retaining ring groove, which is located at a side of the shaft opposite to the side at which the pulling force is applied shaft.

The contacting points prevent the retaining ring from contracting when a force is applied to the shaft in a pulling out direction because the two contacting points contact the inner surface of the retaining ring, thereby preventing the contracting movement of the ring. Thus, the shaft cannot be pulled out.

The present invention further comprises a step part on one side of the retaining ring groove that is opposite to the side of the shaft to which the pulling force is applied. The step part has a depth less than the thickness of the retaining ring.

The shaft and the inner joint member are coupled with a spline section. The shaft cannot be pulled out because the retaining ring and its groove are located outside the spline section of the inner joint member and the retaining ring is sandwiched between the at least two contacting points of the groove and the slope part of the insertion hole, thereby preventing inward movement of the ring.

As the shaft is inserted into and coupled with the insertion hole of the inner joint member through the spline section, the retaining ring groove is located in the range of a slope part formed in the spline section of the inner joint member which faces toward the retaining ring groove wall of the shaft.

With this configuration, even when a force is applied to one side of the shaft in a pulling out direction, the slope part formed in the spline section of the inner joint member, and the at least two contacting faces formed on a side wall of the retaining ring groove located at the opposite side of the shaft, or the step part contact with an inner surface of the retaining ring and sandwich the retaining ring, thereby surely preventing movement in a radial contracting direction.

With the present invention, when a force is applied to the shaft in a pulling out direction, a lower surface side of the retaining ring and at least two contacting faces of the retaining ring groove, or the step part make contact, and therefore, movement of the retaining ring in a radial contracting direction is prevented. Thus, a structure for preventing disassembly of the inner joint member and the shaft can be produced simply.

Accordingly, it is possible to produce a structure which allows disassembly and a structure that prevents disassembly based on the structure of a side wall of a retaining ring groove formed on a shaft without employing a particular inner joint member and a particular retaining ring. Therefore, shared use of parts is made possible, thereby reducing the man-hours required for parts control.

In order to allow disassembly of an inner joint member and a shaft, with the at least two contacting faces on a side wall of a retaining ring groove of a shaft, and the step part, by which such a force is given to move the retaining ring in a radial contracting direction using slope part at inner joint member side as slope surface are not provided. Thus, when a force is applied to the shaft in a pulling out direction, the diameter of the retaining ring is contracted, the retaining ring is moved in the insertion hole, and the retaining ring does not prevent disassembly.

DETAILED DESCRIPTION OF THE INVENTION

Figure 1:
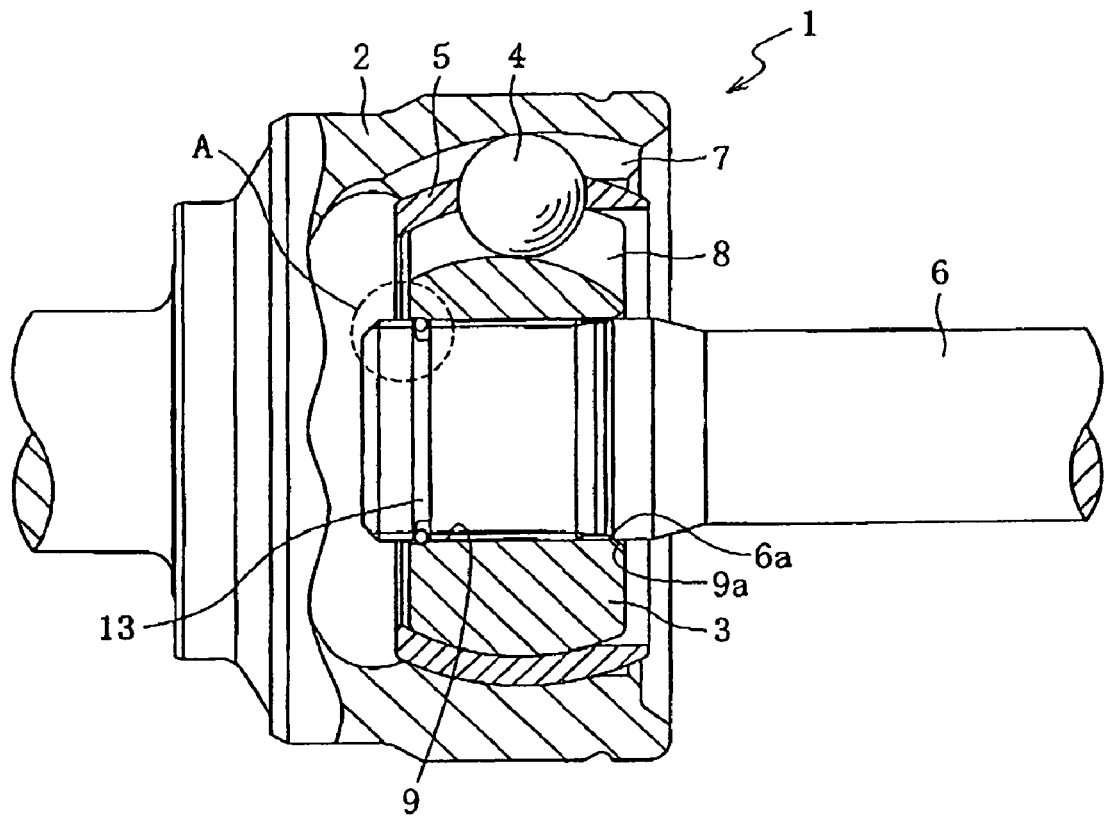
FIG. 1 is a fragmentary sectional view of a constant velocity joint showing embodiment of the present invention.

Referring now to FIG. 1 to FIG. 8, the embodiments of the present invention will be explained. For convenience of explanation, "front edge side" denotes the left side in the drawings and "anti-front edge side" denotes the right side in the drawings. For convenience, explanations will be given referring to a fixed type constant velocity joint, as shown in FIG. 1, in which the inner joint member is also referred to as an inner ring.

As shown in FIG. 1, the fixed type constant velocity joint 1 comprises outer ring 2, inner joint member 3, torque transmission ball 4, and cage 5 for torque transmission ball 4. Further, shaft 6 for transmitting torque is mounted to the inner joint member 3 in an engaging manner. The constant velocity joint is not limited to the fixed type constant velocity joint 1, and may be a sliding movement type constant velocity joint such as a double-offset type, a cross-groove type, a tripod type, or the like. The inner joint member in the double-offset type and the cross-groove type are also referred to as the inner ring, while the inner joint member in the tripod type is referred to as a trunnion.

A curved guide groove 7 is formed on a spherical inside diameter surface of the outer ring 2 in a circumferential direction at regular intervals. A curved guide groove 8 is formed on a spherical outside diameter surface of the inner joint member 3 in a circumferential direction at regular intervals. The torque transmission ball 4 is built into a ball track formed by the guide groove 7 of the outer ring 2 and the guide groove 8 of the inner joint member 3.

Figure 2:
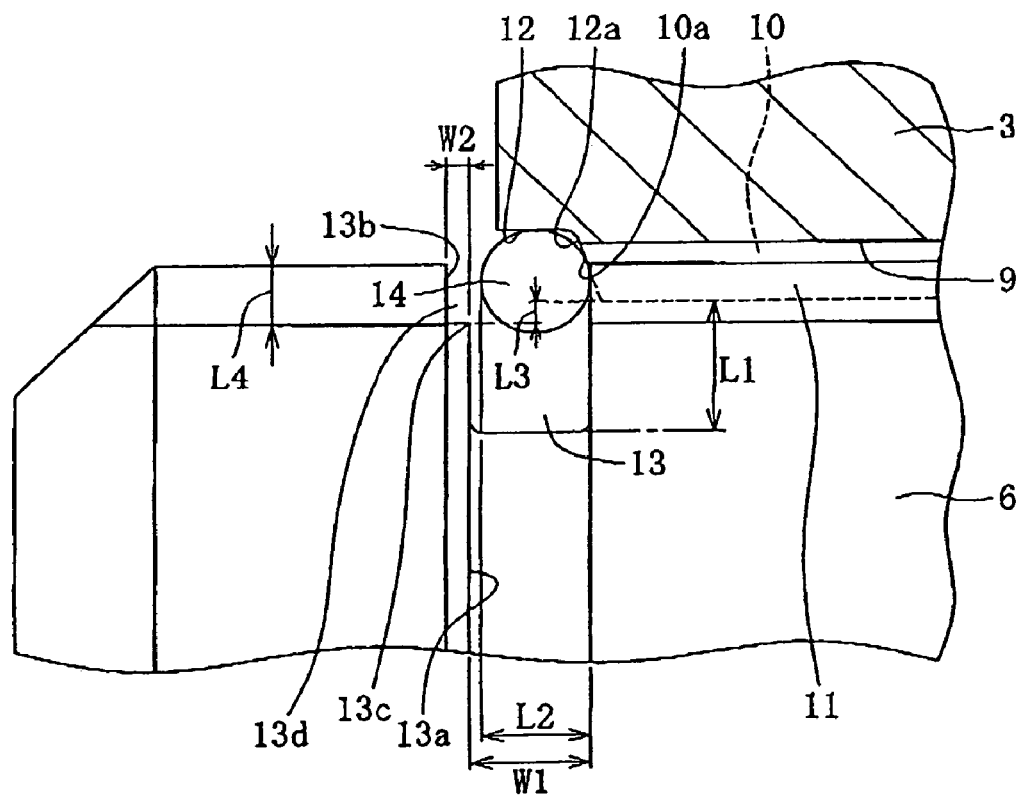
FIG. 2 is an enlarged view of part A in FIG. 1.

As shown in FIG. 2, an insertion hole 9 for engagement with the shaft 6 is formed on the inner joint member 3 in an axial direction. A spline 10 is formed on an inner circumferential surface of insertion hole 9. When the spine 10 is engaged with a spline 11 formed on the shaft 6, the inner joint member 3 and the shaft 6 are transmittably coupled. The distance L3 corresponds to the distance between the inner radial limit of shaft spine 11 and the inner radial limit of joint member spine 10.

The front edge side of the shaft 6 of the insertion hole 9 is subjected to diameter expansion processing as shown in FIG. 2, and a hole 12 having diameter larger than the insertion hole 9 is formed. The hole 12 is continuous with a tapered, terminal part 10a of the spline 10 via a slope surface 12a.

Figure 4:
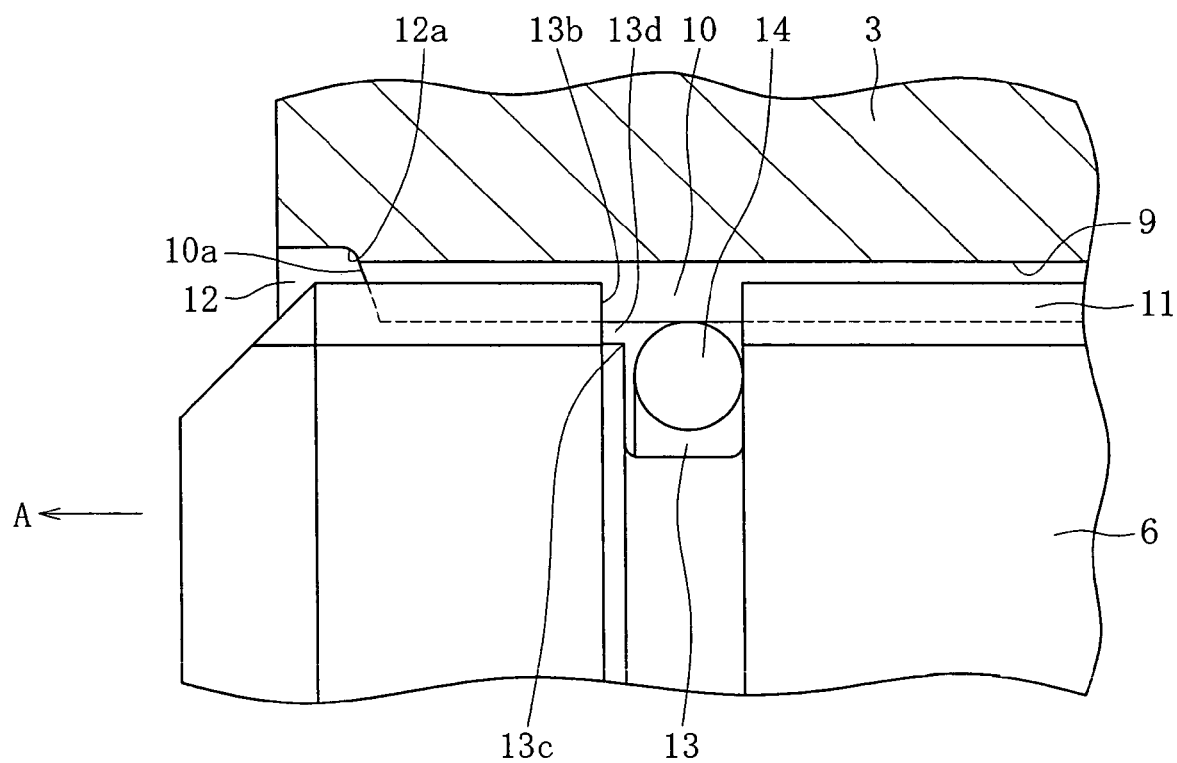
FIG. 4 is a sectional view showing a shaft pulled out state corresponding to FIG. 2.

A retaining ring groove 13 having a ring shape is formed at a front edge side of the shaft 6. As shown in FIG. 2, depth L1 and width W1 of this retaining ring groove 13 are greater than wire diameter L2 of a retaining ring 14 for preventing a breakaway of the inner joint member 3 and the shaft 6 (L1>L2, W1>L2). With this configuration, when the shaft 6 is inserted into the insertion hole 9 of the inner joint member 3 from right to left, as shown in FIG. 4, it is possible to cause the retaining ring 14 to contract to a diameter less than a minor diameter of the spline 10 of the inner joint member 3.

Figure 3:
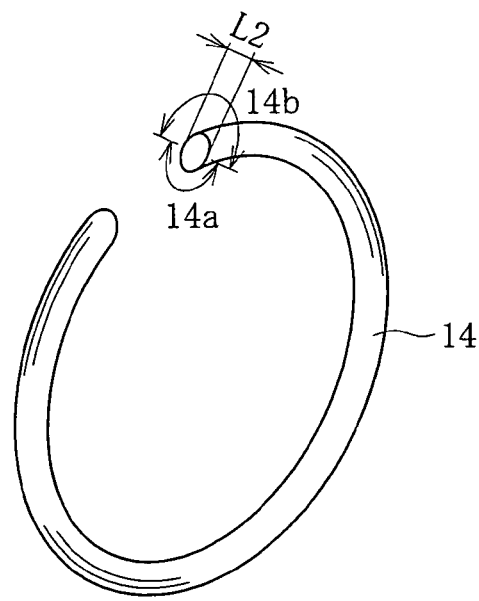
FIG. 3 is a perspective view of retaining ring shown in FIG. 1.

As shown in FIG. 3, although the retaining ring 14 has a ring shape, it is cut in part so that it may be inserted into the retaining ring groove 13 after diameter contraction.

On a wall 13a at a front edge side of the retaining ring groove 13 (side wall at the side of the shaft opposite to the side to which the pulling force is applied) are formed a wall 13b perpendicular to an axis line to which an inner surface 14a of the retaining ring 14 makes contact when a force is applied to the shaft 6 in a pulling out direction, and an orthogonal step part 13d which forms a corner 13c. This step part 13d has a depth L4 in radial direction of the shaft 6, and a width W2 in axial direction, both of which are smaller than wire diameter L2 of the retaining ring 14 (L2>L4, L2>W2). The step part 13d has a radial direction dimension L4 that is smaller than wire diameter L2 of the retaining ring 13, and an axial direction dimension W2 that is smaller than the same.

An inner surface of the retaining ring 14 (a center side surface since the retaining ring 14 is being formed in a ring-shape), is designated by arrow 14a in FIG. 3. The inner surface 14a is a half circle for a ring having a circular cross section, and includes the boundary between the lower surface and the upper surface of the retaining ring.

When L2≦L3, since the retaining ring 14 is accommodated within the step part 13d, the function for preventing the shaft from coming off is lost. Further, as shown in FIG. 2, the retaining ring 14 does not interfere with the inner diameter of the inner joint member spline 10. Besides, when L2≦W2, the width of the retaining ring 13 becomes larger and an idle space where the shaft 6 can move in right and left directions in FIG. 2 becomes large, which is not practical.

As for attachment of the shaft 6 to the inner joint member 3, the shaft 6 is inserted into the insertion hole 9 while the retaining ring 14 is disposed in the retaining ring groove 13 and diameter contracted. On this occasion, the retaining ring 14 moves in a sliding state while making elastic contact with the spline 10 of the insertion hole 9 (arrow A direction in FIG. 4).

When the front edge of the shaft 6 reaches a position passing through the insertion hole 9 (virtually, a position where contact with the spline 10 is lost), an end 9a at the anti-front edge side of the insertion hole 9 makes contact with a part 6a of the shaft 6, and further insertion is prevented. Alternatively, a retaining ring may be mounted separately to regulate the length of the shaft 6 inserted, in which case the retaining ring makes contact with the anti-front edge side of the insertion hole 9, thereby preventing further insertion.

At the point of time when insertion of the shaft 6 into the insertion hole 9 is ceased, the retaining ring 14 is no longer in contact with spline 10, and positioned at the hole 12, which has a larger diameter. Therefore, the diameter is expanded elasticity. When the diameter of the retaining ring 14 is expanded, an outer circumferential surface of the retaining ring 14 comes to contact with a peripheral wall of the hole 12 by elastic force, and therefore, the shaft 6 is becomes attached to the inner joint member 3.

At this state, the retaining ring 14 is not expanded completely and is positioned within an engagement range of the splines 10 and 11, while making contact with the peripheral wall of the hole 12 and the tapered part 10a.

Figure 5:
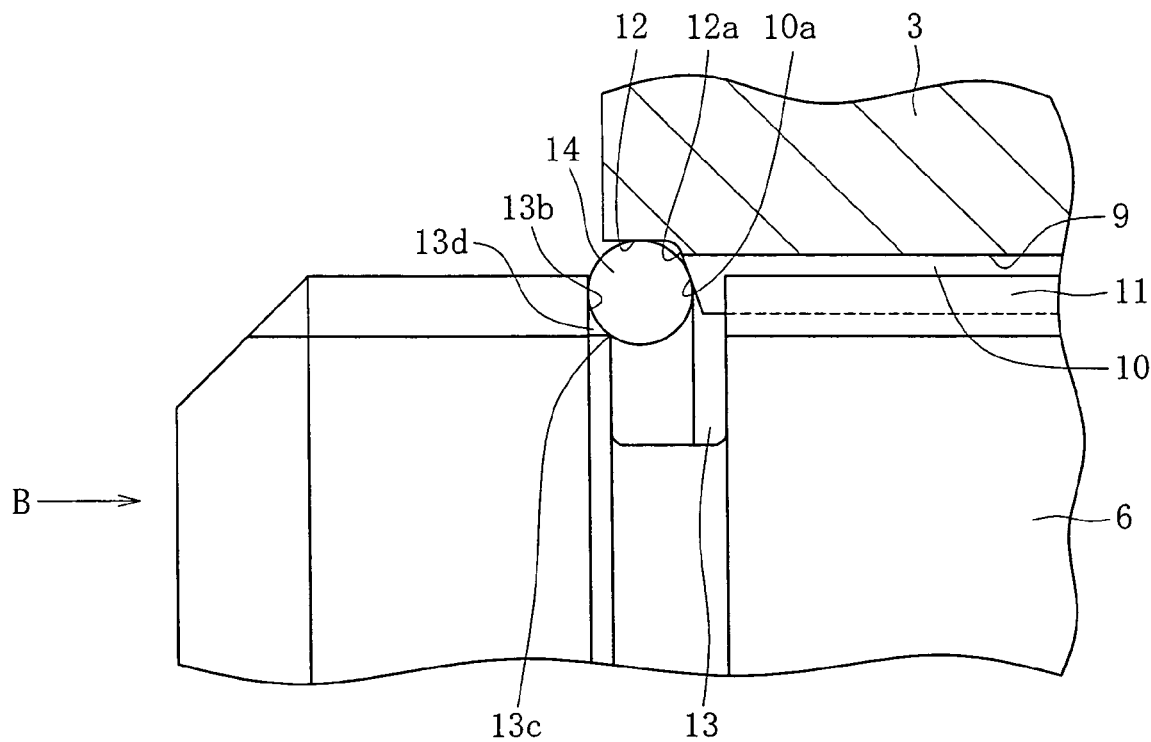
FIG. 5 is a sectional view showing a retaining ring corresponding to FIG. 2 in sandwiched state.
Figure 6:
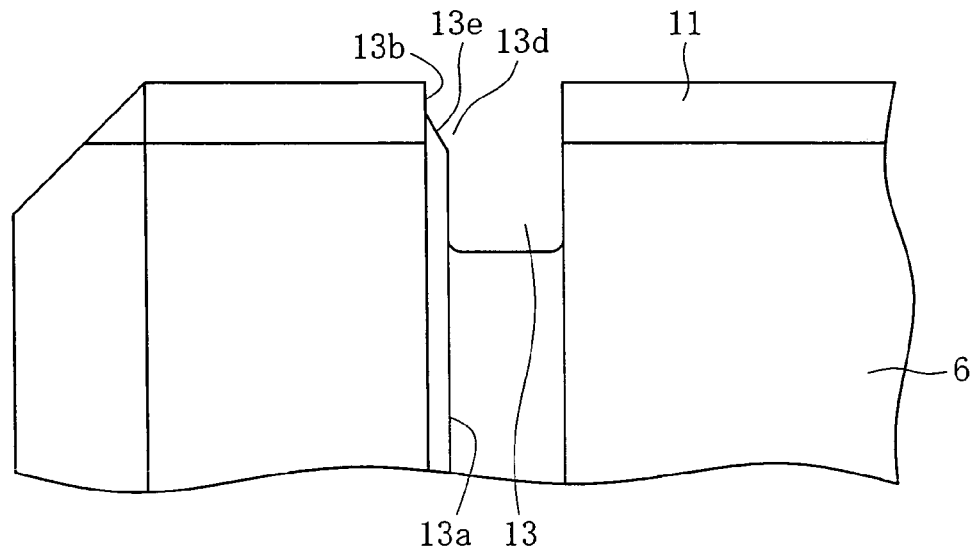
FIG. 6 is a sectional view showing a first embodiment of a retaining ring groove illustrated in FIG. 2.
Figure 7:
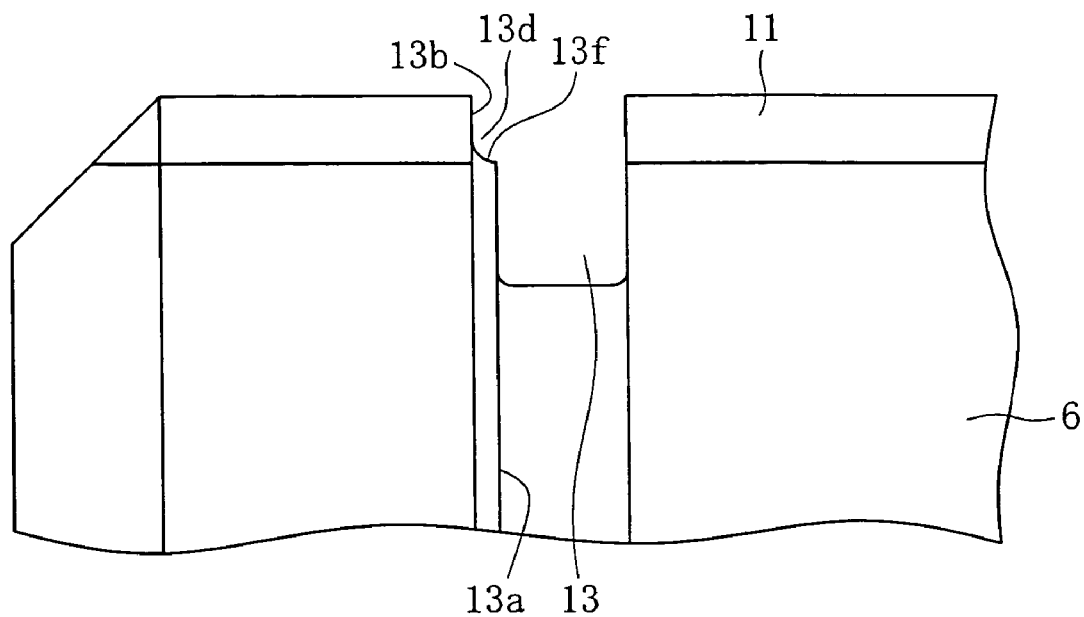
FIG. 7 is a sectional view showing a second embodiment of a retaining ring groove illustrated in FIG. 2.

Therefore, when a force (arrow B direction in FIG. 5) is applied to the shaft 6 in a pulling out direction, the shaft 6 moves horizontally from the position illustrated FIG. 2 to the position illustrated in FIG. 5 (this means movement in a direction of disengagement of splines 10 and 11). At this moment, a surface positioned at the front edge side of the lower surface 14a of the retaining ring 14 makes contact with two points, the perpendicular wall 13b of the step part 13d, and the corner 13c. At the same time, the anti-front edge side of the upper surface 14b of the retaining ring 14 makes contact with either the tapered part 10a formed at the terminal part of the spline 10 of the inner joint member 3 or the slope part 12a, and the retaining ring 14 is brought into sandwiched state.

The retaining ring 14 contacts the perpendicular wall 13b at the boundary between its inner surface 14a and its upper surface 14b. The lower surface 14a of the retaining ring contacts the corner 13c at a lower left circular arc surface, i.e. the quarter area corresponding to the area from the six o'clock position to the nine o'clock position in FIG. 5.

The perpendicular wall 13b formed at the front edge side of the retaining ring groove 13 and the corner 13c act as a contacting face of the shaft side, and the tapered part 10a at the terminal part of the spline 10 or the slope part 12a act as a slope part of the insertion hole 9 at inner joint member 3 side.

When a pulling force is applied to the shaft, the perpendicular wall 13b, an inward force is applied to the retaining ring by a slope part (tapered part 10a or slope part 12a) to urge the ring to be contracted in a direction toward the center of the shaft. However, the contraction movement of the ring is prevented by the contacting part of the retaining ring groove 13, i.e., the perpendicular wall 13b and the corner 13c. Thus, the retaining ring 14 cannot be entered in the retaining ring groove 13 and locked. As a result, the shaft 6 cannot be pulled out.

In the case where the shaft 6 needs to be removed from the inner joint member 3, the step part 13d in the retaining ring groove 13 of the shaft 6 is not necessary. If the step part 13d is not formed and a force is applied to the shaft 6 in a pulling out direction, the retaining ring 14 is urged by the tapered part 10a and slope surface 12a into the retaining ring groove 13. As a result, the shaft 6 can be removed in a direction opposite to arrow A in FIG. 4.

As mentioned above, the step part 13d is obvious since the step 13 is formed in the retaining ring groove 13 of the shaft 6. To render the shaft 6 removable, the step part 13d in the retaining ring groove 13 of the shaft 6 should be abolished. The appearance of the shaft provides a clear recognition if the shaft is removable or not. Further, common use of inner joint member can be accomplished in each construction where the shaft is removable or non-removable, thereby reducing the man-hours required for parts control.

When assembling the inner joint member 3 and the shaft 6, no special structure for preventing the removal of the shaft is needed, and the conventional way of assembling can be simply used by contracting the retaining ring and inserting the same into the insertion hole of the inner joint member 3.

Also, the profile of the step part 13d may not necessarily be formed by the perpendicular wall 13b and the corner 13c as shown in FIG. 1. For example, a profile formed by the perpendicular wall 13b and the corner 13e shown in FIG. 6, or by the perpendicular wall 13b and the circular arc surface 13f shown in FIG. 7 can also provide at least two contacting parts. Although the step part 13d has been explained based on two contacting parts, it is possible to increase the number of contacting parts depending on the profile of step part.

Figure 8:
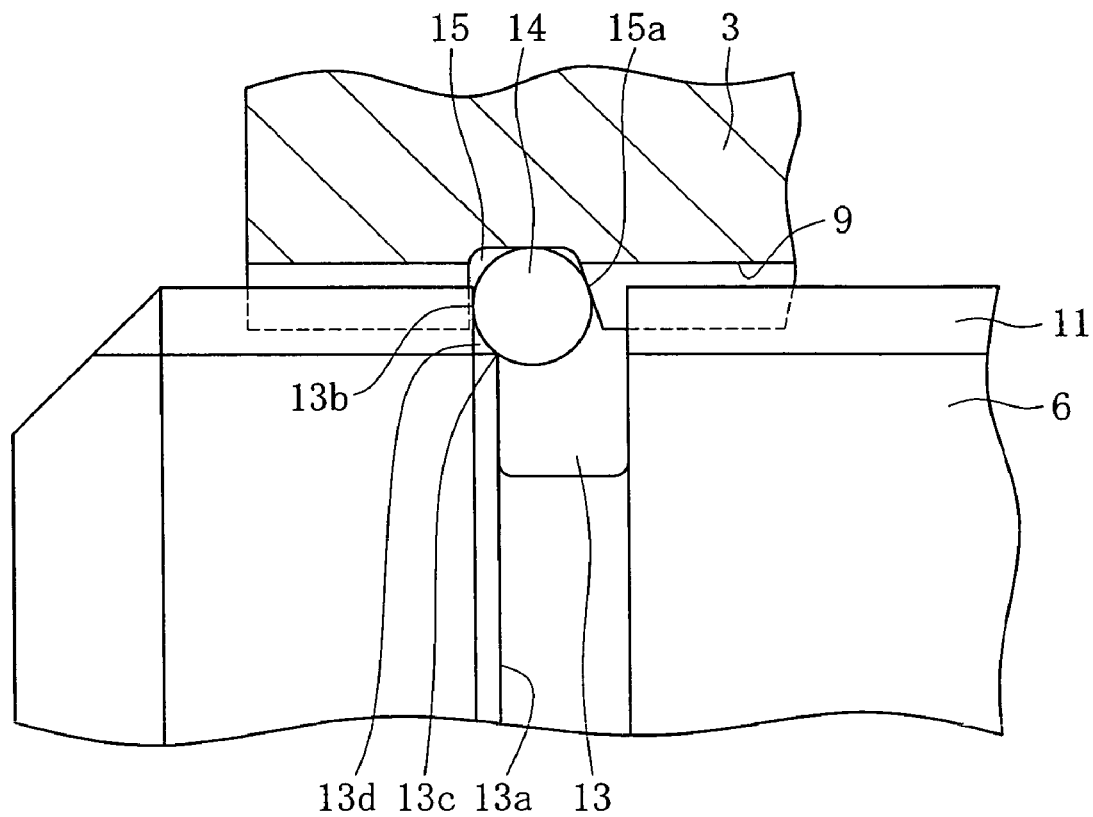
FIG. 8 is a sectional view showing a retaining ring groove illustrated in FIG. 2 in a different position.

Furthermore, the hole may be located anywhere within a range of the insertion hole 9 of the inner joint member 3. For example, as shown in FIG. 8, a hole 15 is provided in the middle of the spline 10. This hole 15 and the retaining ring 14 are disposed opposedly so that a part of the retaining ring 14 can be introduced into the hole 15. In this configuration, the structure of the retaining ring groove 13 is the same as that in FIG. 2, and a slope part of the inner joint member 3 forms a wall 15a at an anti-front side of the hole 15. If a wall 15a is tilted so that the open side of the hole is widened in similar fashion as the slope surface 12a being continuous with the tapered part 10a of the spline 10, as the operations attained by the structure illustrated in FIG. 2 are also obtained.

What is claimed is:

1. A constant velocity joint structure comprising:
    a shaft having a first end, a second end, and an annular retaining ring groove formed at said first end, wherein a step part is formed on an axial first-end side surface of said retaining ring groove, said step part protruding from said axial first-end side surface into said retaining ring groove;
    an inner joint member configured to receive and engage said shaft, said inner joint member defining an insertion hole having an inner surface; and
    a retaining ring positioned in said retaining ring groove, said retaining ring being radially expandable and contractible elastically, wherein said shaft, said inner joint member, and said retaining ring are shaped and arranged such that when said shaft is engaged with said insertion hole and an axial force is applied to said shaft, said retaining ring contacts and engages with said step part and said inner surface of said insertion hole to thereby prevent said shaft from becoming disengaged from said inner joint member and moving axially with respect to said inner joint member.

2. The constant velocity joint structure according to claim 1, wherein said inner surface of said insertion hole includes a sloped portion, said sloped portion being sloped relative to a plane perpendicular to a longitudinal axis of said shaft, said sloped portion being located such that, when said shaft is engaged with said insertion hole and the axial force is applied to said shaft, said retaining ring contacts and engages with said sloped portion.

3. The constant velocity joint structure according to claim 2, wherein said inner surface of said insertion hole of said inner joint member further comprises a spline section for engaging with said shaft, and said sloped portion is formed outside of said spline section in an axial direction thereof.

4. The constant velocity joint structure according to claim 2, wherein said inner surface of said insertion hole of said inner joint member further comprises a spline section for engaging with said shaft, said spline section having a groove located proximate to said second side of said shaft, wherein said sloped portion is a sidewall of said groove and said retaining ring groove is opposed to said groove.

5. The constant velocity joint structure according to claim 4, wherein said upper surface of said step part is parallel to a longitudinal axis of said shaft.

6. The constant velocity joint structure according to claim 4, wherein said upper surface of said step part is a circular arc.

7. The constant velocity joint structure according to claim 4, wherein said upper surface of said step part is sloped relative to a longitudinal axis of said shaft.

8. The constant velocity joint structure according to claim 1, wherein said retaining ring, said retaining ring groove, said step part, and said shaft are shaped and arranged such that when said shaft is engaged with said insertion hole and an axial force is applied to said second side of said shaft, an upper surface of said step part and said axial inner surface of said retaining ring groove contact said retaining ring such that said retaining ring is contacted by at least two points on said ring retaining groove.

9. The constant velocity joint structure according to claim 1, wherein said step part has a depth in a radial direction of said shaft which is less than a diameter of said retaining ring.

10. The constant velocity joint structure according to claim 1, wherein said retaining ring has a circular cross section, and contracts radially when the axial force is applied to the shaft.

* * * * *